(12) United States Patent
Wang et al.

(10) Patent No.: US 10,104,493 B2
(45) Date of Patent: Oct. 16, 2018

(54) MULTIPLE ANTENNA AP POSITIONING IN WIRELESS LOCAL AREA NETWORKS

(71) Applicant: MEDIATEK Singapore Pte. Ltd., Singapore (SG)

(72) Inventors: James June-Ming Wang, San Marino, CA (US); Thomas Edward Pare, Jr., Mountain View, CA (US); Yuh-Ren Jauh, Taoyuan County (TW); YungPing Hsu, Taipei (TW); Chih-Shi Yee, Hsinchu County (TW); Chao-Chun Wang, Taipei (TW); Gabor Bajko, Santa Clara, CA (US)

(73) Assignee: MEDIATEK Singapore Pte Ltd, Singapore (SG)

(*) Notice: Subject to any disclaimer, the term of this patent is extended or adjusted under 35 U.S.C. 154(b) by 62 days.

(21) Appl. No.: 14/508,979

(22) Filed: Oct. 7, 2014

(65) Prior Publication Data
US 2015/0099538 A1    Apr. 9, 2015

Related U.S. Application Data

(60) Provisional application No. 61/888,124, filed on Oct. 8, 2013.

(51) Int. Cl.
*H04W 4/02* (2018.01)
*G01S 5/00* (2006.01)
(Continued)

(52) U.S. Cl.
CPC .............. *H04W 4/02* (2013.01); *G01S 5/00* (2013.01); *G01S 5/0226* (2013.01); *G01S 5/14* (2013.01);
(Continued)

(58) Field of Classification Search
CPC . G01S 5/00; G01S 5/0226; G01S 5/14; G01S 13/876; H04W 4/02; H04W 64/003; H04W 84/12
(Continued)

(56) References Cited

U.S. PATENT DOCUMENTS

2003/0007473 A1    1/2003  Strong et al. .............. 370/338
2004/0257284 A1*  12/2004  Rada .................... H01Q 1/241
                                                             343/702
(Continued)

FOREIGN PATENT DOCUMENTS

WO    WO2006039119 A1    9/2004

OTHER PUBLICATIONS

International Search Report and Written Opinion of International Search Authority for PCT/US2014/059581 dated Jan. 13, 2015 (8 pages).
(Continued)

*Primary Examiner* — Kamran Afshar
*Assistant Examiner* — Farid Seyedvosoghi
(74) *Attorney, Agent, or Firm* — Imperium Patent Works; Zheng Jin; Mark Marrello

(57) ABSTRACT

A method of indoor positioning using Fine Timing Measurement (FTM) protocol with multi-antenna access point (AP) is proposed. In a wireless local area network, an AP has multiple antennas that are strategically located in different physical locations. The AP is used to exchange FTM frames with a wireless station for timing measurement of the FTM frames via its multiple antennas independently. The timing measurement result (e.g., timestamps of transmitting and receiving FTM frames) is then used to determine an absolute location of the station. A simplified Indoor Location operation with simplified deployment is achieved.

12 Claims, 12 Drawing Sheets

(51) Int. Cl.
*H04W 64/00* (2009.01)
*G01S 5/02* (2010.01)
*G01S 5/14* (2006.01)
*G01S 13/76* (2006.01)
*G01S 13/87* (2006.01)
*H04W 84/12* (2009.01)

(52) U.S. Cl.
CPC .......... *G01S 13/767* (2013.01); *G01S 13/876* (2013.01); *H04W 64/003* (2013.01); *H04W 84/12* (2013.01)

(58) Field of Classification Search
USPC ................... 455/456.1; 342/374; 370/331
See application file for complete search history.

(56) References Cited

U.S. PATENT DOCUMENTS

| | | | |
|---|---|---|---|
| 2005/0146464 A1 | 7/2005 | Zegelin et al. | 342/453 |
| 2006/0107307 A1 | 5/2006 | Knox et al. | 726/2 |
| 2008/0224924 A1 | 9/2008 | Lethbridge | 342/357.1 |
| 2010/0046494 A1 | 2/2010 | Palanki et al. | 370/344 |
| 2012/0002702 A1* | 1/2012 | Lakkis | G01S 1/20 375/130 |
| 2012/0182180 A1 | 7/2012 | Wolf et al. | 342/357.29 |
| 2012/0269170 A1* | 10/2012 | Chen | G01S 13/878 370/331 |
| 2012/0306691 A1 | 12/2012 | Werner | 342/357.29 |
| 2013/0203447 A1 | 8/2013 | Hannan et al. | 455/456.5 |
| 2014/0073352 A1* | 3/2014 | Aldana | G01S 5/10 455/456.1 |
| 2014/0187259 A1* | 7/2014 | Kakani | H04W 64/00 455/456.1 |
| 2014/0327579 A1* | 11/2014 | Hart | H04W 64/006 342/374 |
| 2014/0335885 A1* | 11/2014 | Steiner | H04W 64/00 455/456.1 |

OTHER PUBLICATIONS

EPO, Search Report for the EP patent application 14851890.5 dated May 3, 2017 (8 pages).

Carlos Aldana et al., IEEE P802.11 Wireless LANs, Jan. 2013 (17 pages).

* cited by examiner

MULTI-ANTENNA AP BASELINE PROTOCOL
STA INITIATING FTM
DIFFERENT SSID FOR DIFFERENT ANTENNA

MULTI-ANTENNA AP BASELINE PROTOCOL
AP INITIATING FTM

MULTI-ANTENNA AP HYBRID PROTOCOL

MULTI-ANTENNA AP SIMPLIFIED IMPLEMENTATION
STA INITIATING FTM

MULTI-ANTENNA AP SIMPLIFIED IMPLEMENTATION
AP INITIATING FTM

MULTI-ANTENNA AP SIMPLIFIED IMPLEMENTATION
AP INITIATING FTM USING ANGLE OF ARRIVAL

MULTI-ANTENNA AP SIMPLIFIED IMPLEMENTATION
REDUCING AIRTIME

MULTIPLE ANTENNA AP POSITIONING IN WIRELESS LOCAL AREA NETWORKS

CROSS REFERENCE TO RELATED APPLICATIONS

This application claims priority under 35 U.S.C. § 119 from U.S. Provisional Application No. 61/888,124, entitled "Multiple Antenna AP positioning," filed on Oct. 8, 2013, the subject matter of which is incorporated herein by reference.

TECHNICAL FIELD

The disclosed embodiments relate generally to wireless network communications, and, more particularly, to multiple antenna AP positioning in wireless local area networks.

BACKGROUND

IEEE 802.11 is a set of media access control (MAC) and physical layer (PHY) specification for implementing wireless local area network (WLAN) communication, called Wi-Fi, in the unlicensed (2.4, 3.6, 5, and 60 GHz) frequency bands. The standards and amendments provide the basis for wireless network products using the Wi-Fi frequency bands. Wi-Fi plays an important role in the growing application of Indoor Location. The key applicable Wi-Fi technology is that of ranging using time-of-flight (TOF) ranging measurements defined in IEEE 802.11v. Once the distance between devices is measured, the information can be used to determine device location.

In IEEE 802.11-REVmc, Fine Timing Measurement (FTM) protocol is proposed for Indoor Location. Based on FTM, an initiating station exchanges FTM frames with a responding station to measure the time-of-flight (TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the station performs ranging measurements with multiple access points (APs) via FTM frame exchange and obtains AP's positions. FTM positioning requires the initiating station to exchange FTM frames with multiple responding APs for TOF measurements in order to determine its absolute location. For 3D positioning, the station needs to exchange FTM frames with four APs in order to determine its absolute location.

FIG. 1 (Prior Art) illustrates conceptually an FTM positioning procedure. As illustrated in FIG. 1, the FTM positioning procedure starts with a setup phase, followed with a measurement phase, and ended with a tear down phase. During the setup phase, the initiating station STA sends an FTM request or FTM requests to each of the responding APs, AP1-AP4, and wait for acknowledgments (ACKs) from AP1-AP4. In communicating with each responding AP, the initiating station STA might be required to switch to the operating channel of the responding AP if the station's current channel is different from the operating channels of the AP. The FTM request contains FTM related parameters including the start time and the duration of the subsequent FTM frame exchange. After the setup phase, the STA starts the measurement phase with each AP. During each measurement session, the STA exchanges FTM frames and obtains measurement results for TOF with each AP and thereby computing its distance to the corresponding AP. Again, channel switching between each measurement session may be needed if the wireless channels of the APs are different. After four measurement sessions with AP1-AP4 are completed, the STA is then able to determine its absolute location given the APs' positions. Finally, the STA and the APs go through a tear down phase to end the FTM positioning procedure.

FIG. 1B (Prior Art) illustrates the geometry of AP positions. As well known in the teaching of navigation science, the STA positioning error, obtained from processing the timing measurements, is related to the geometry of the AP positions. This is typically describes by a parameter call PDOP (Position of Dilation). The PDOP is inversely proportional to the volume of tetrahedron formed by unit directional vectors between AP and STA positions. To achieve low positioning error, it is necessary that APs be deployed at strategically selected positions within a coverage area.

The FTM protocol suffers from a list of drawbacks. First, the station possibly needs to switch to different channels in which the APs operate on. Second, the station needs to consume high power due to the long sessions of FTM frame exchange. Third, dense AP deployment is required to provide good coverage for supporting FTM positioning. Fourth, FTM traffic load increases when more stations perform positioning. The FTM protocol overhead can be substantial if all stations in a dense environment need to perform ranging independently. A solution for simplified Indoor Location operation with simplified deployment is sought.

SUMMARY

A method of indoor positioning using Fine Timing Measurement (FTM) protocol with multi-antenna access point (AP) is proposed. In a wireless local area network, an AP has multiple antennas that are strategically located in different physical locations. The AP is used to exchange FTM frames with a wireless station for timing measurement of the FTM frames via its multiple antennas independently. The timing measurement result (e.g., timestamps corresponding to the departure time of transmitting and the arrival time of the receiving FTM frames) is then used to determine an absolute location of the station. A simplified Indoor Location operation with simplified deployment is achieved.

In a first embodiment, a wireless station (STA) requests FTM measurement with an access point (AP) using Wi-Fi technology in an indoor wireless local area network. The AP exchanges FTM frames with the station via a first antenna and measures a first set of timestamps associated with the first antenna. The AP also exchanges FTM frames with the station via a second antenna and measures a second set of timestamps associated with the second antenna. The AP then transmits the first and the second set of timestamps to the station. Alternately, AP can exchange FTM frames with the station via only one of its antenna and simultaneously measure the timestamps (of the FTM frame arrival times) from all its antennas.

In a second embodiment, an access point (AP) transmits an FTM request to a wireless station (STA) using Wi-Fi technology in an indoor wireless local area network. The AP exchanges FTM frames with the station via a first antenna and receives a first set of timestamps associated with the first antenna. The AP also exchanges FTM frames with the station via a second antenna and receives a second set of timestamps associated with the second antenna. The AP then determines a location of the station based at least in part on the first and the second set of timestamps. Alternately, AP can request FTM frames with the station via only one of its antenna and simultaneously measure the timestamps (of the FTM frame arrival times) from all its antennas.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1A:
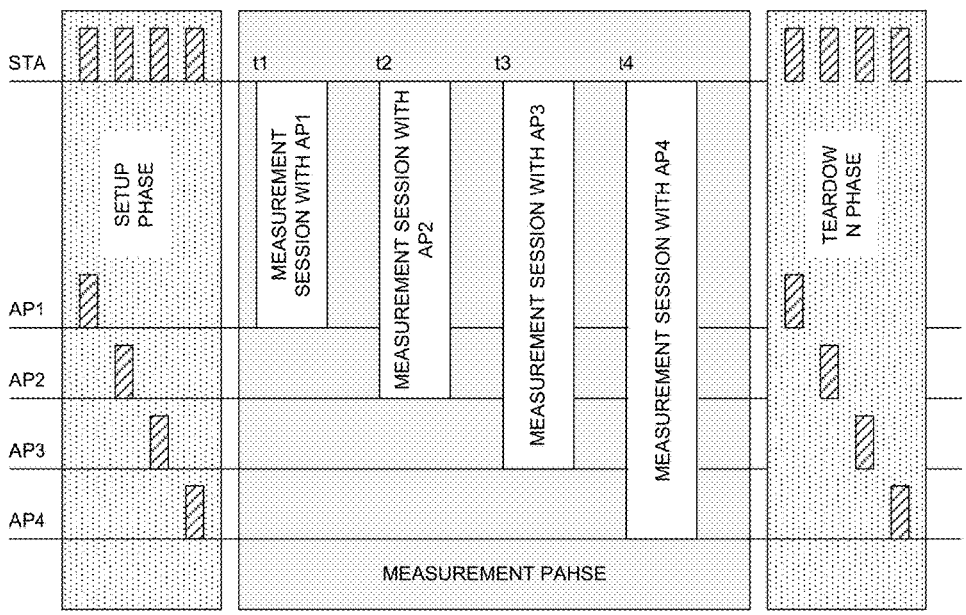
FIG. 1A (Prior Art) illustrates a baseline FTM positioning procedure.
Figure 1B:
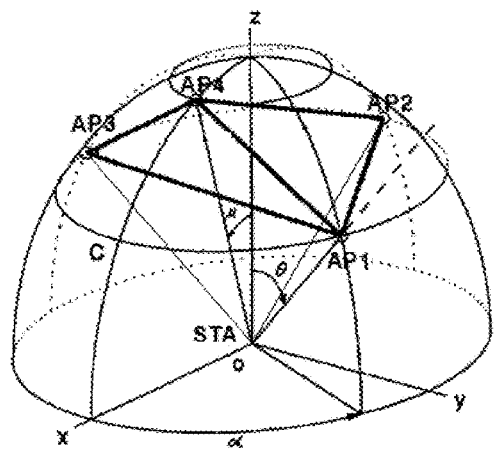
FIG. 1B (Prior Art) illustrates the geometry of AP positions.
Figure 2A:
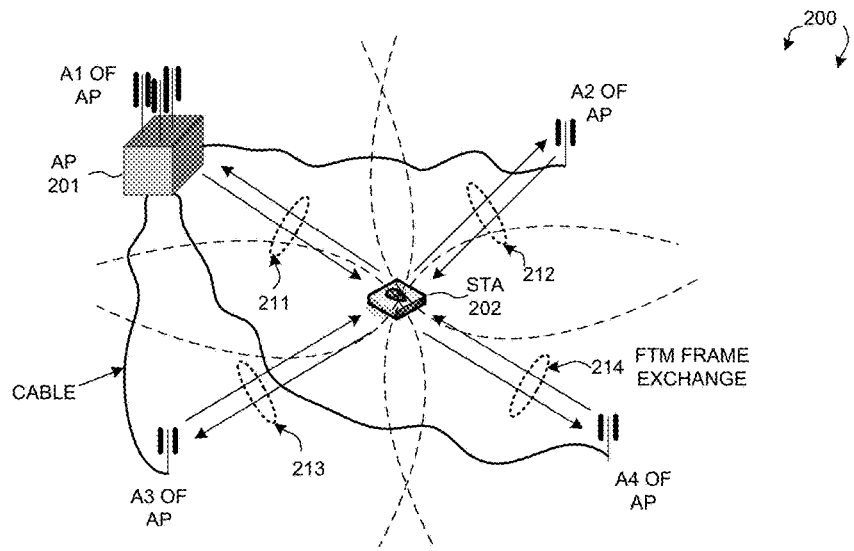
FIG. 2A illustrates a wireless local area network supporting multi-antenna AP FTM protocol in accordance with one novel aspect.

FIG. 2A illustrates a wireless local area network 200 supporting multi-antenna AP FTM protocol in accordance with one novel aspect. Wireless local area network 200 is an indoor network and comprises a multi-antenna access point AP 201 and a wireless non-AP station STA 202. AP 201 is a multi-antenna AP comprising at least four antennas A1-A4. The multiple antennas are physical located in separate strategically chosen physical locations, via long extending cables. AP 201 has information about all the absolute locations of the multiple antennas. In the example of FIG. 2, AP 201 is used to provide positioning service for STA 202 in an indoor environment via Fine Timing Measurement (FTM) protocol.

Under the FTM protocol, an initiating station exchanges FTM frames with a responding station to measure the time-of-flight (TOF) or the Round Trip Delay (RTD/2). The initiating station then computes its range to the responding station. Based on the location of the responding station, the initiating station is then able to determine its own location. Typically, FTM positioning requires the initiating station to exchange FTM frames with multiple responding APs for TOF measurements in order to determine its absolute location. For 3D positioning, the station needs to exchange FTM frames with four APs in order to determine its absolute location.

In accordance with one novel aspect, AP 201 has multiple antennas, which are located in strategically chosen locations and can be used to exchange FTM frames with STA 202 independently. For example, STA 202 measures the TOF to A1 of AP 201 via FTM frame exchange 211, the TOF to A2 of AP 201 via FTM frame exchange 212, the TOF to A3 of AP 201 via FTM frame exchange 213, and the TOF to A4 of AP 201 via FTM frame exchange 214. STA 202 is then able to compute its ranges to the different antennas A1-A4 of the same AP 201 and thereby determining its absolute location. As a result, the proposed FTM positioning method involves simplified operation and simplified deployment. Only one multi-antenna AP is needed, thus no channel switching is required. The STA power consumption can be reduced significantly due to reduced channel switching operation. The network loading is also be reduced due to simpler set up. Four-time reduction of the FTM measurement frame exchange can be achieved. In one embodiment, operation via each antenna can be assigned a separate BSSID (Basic Service Set ID) such that it appears to be an independent AP. The IEEE 802.11REVmc does not preclude this kind of usage because the AP only needs to provide an explicit list of BSSID values that share the same antenna connector. Therefore, the current IEEE specification allows the proposed multiple antenna operation when each antenna is treated as an independent BSSID.

Figure 2B:
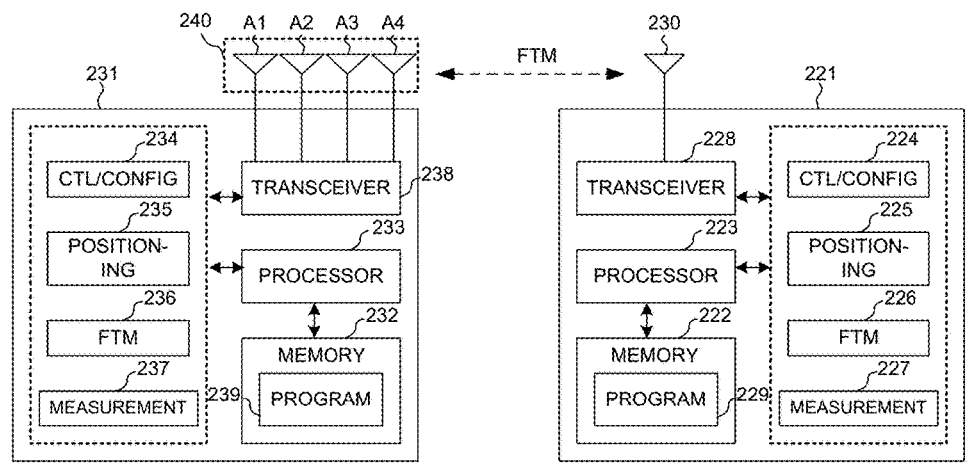
FIG. 2B is a simplified block diagram of a wireless station and an access point supporting certain embodiments of the present invention.

FIG. 2B is a simplified block diagram of an initiating wireless station 221 and a responding wireless station 231 in accordance with one novel aspect. The initiating device is referred to as an initiator, and the responding device is referred to as a responder. Both devices can be an AP station or a non-AP station. Initiating device 221 comprises memory 222, a processor 223, a control and configuration module 224, a positioning module 225, an FTM module 226, and a measurement module 227, and a transceiver 228 coupled to antenna 230. Similarly, responding device 231 comprises memory 232, a processor 233, a control and configuration module 234, a positioning module 235, an FTM module 236, a measurement module 237, and a transceiver 238 coupled to antenna 240. In the example of FIG. 2B, responding device 231 is a multi-antenna AP, e.g., antenna 240 comprises multiple antennas A1-A4. In another example (not shown), the transmitting device 221 can be a multi-antenna AP comprising multiple antennas. In the transmitting direction, the transceiver converts received baseband signals from the processor to RF signals and sends out to the antenna. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 223 and 233 (via program instructions 229 and 239 contained in memory 222 and 232), interwork with each other to allow the wireless devices to perform enhanced channel access. For example, the measurement module performs FTM measurement frame timing measurements, the FTM module establishes the FTM procedure involving setup phase, measurement phase, and tear down phase, the positioning module determines the absolute location of the wireless device based on the FTM measurement result, and the control and configuration module configures FTM related parameters and controls the FTM procedure. The FTM related timing measurements are the departure time of a specific reference point at the transmit frame and the arrival of time of a specific reference point at the receive frame. The hardware delay within the signal path in the transceiver and cable should be calibrated and removed to yield the accurate timestamp measurements at the antenna.

Figures 3, 4A, 4B:
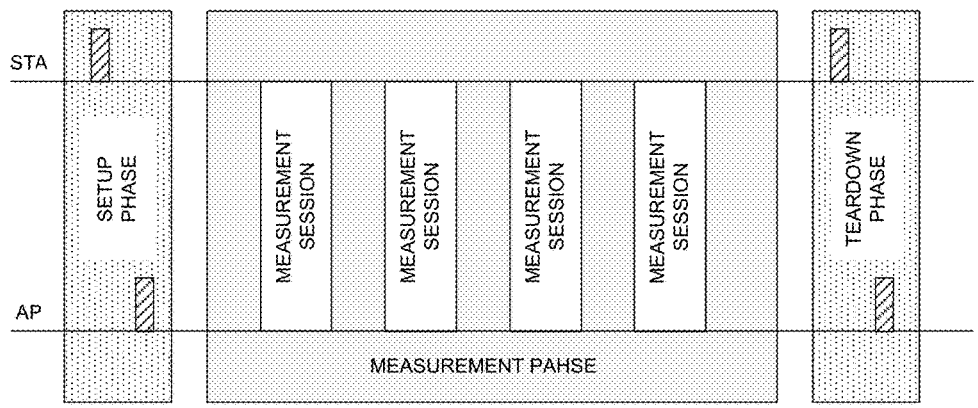
FIG. 3 illustrates a baseline FTM positioning procedure with multi-antenna AP.
FIG. 4A is an example of a FTM request.
FIG. 4B is an example of a FTM frame.

FIG. 3 illustrates a baseline FTM positioning procedure between an initiating station STA and a multi-antenna AP. As illustrated in FIG. 3, the FTM positioning procedure starts with a setup phase, followed with a measurement phase, and ended with a tear down phase. During the setup phase, the STA sends an FTM request to a multi-antenna responding AP, and wait for an acknowledgment (ACK) from the AP. The FTM request contains FTM related parameters including the start time and duration of the subsequent FTM frame exchange. Note that if each antenna of the multi-antenna AP employs a separate BSSID, then it is treated as a separate AP from the STA perspective. As a result, the STA would need to send four FTM requests to each antenna and receive four ACKs from each antenna in order to properly setup the FTM procedure. Alternatively, the STA only needs to send one FTM request to the AP and receive one ACK from the AP to setup the FTM procedure. After setup phase, the STA starts the measurement phase with the AP. During each measurement session, the STA exchanges FTM frames and obtains measurement results for TOF with a corresponding antenna of the AP and thereby computing its distance to the corresponding antenna of the AP. After four measurement sessions with four antennas are completed, the STA is then able to determine its absolute location given the AP/antenna positions. Finally, the STA and the AP go through a tear down phase to end the FTM positioning procedure. Because the FTM frame exchanges are performed with the same AP, channel switching between each measurement sessions are not needed.

FIG. 4A is an example of an FTM request frame 410. As depicted by FIG. 4A, FTM request frame 410 comprises a 1-octet Category field, a 1-octet Public Action field, a 1-octet Trigger field, an optional LCI measurement request, an optional Location Civic Measurement Request field, and an optional FTM Parameter field. The category field is set to the value for Public. The Public Action filed is set to indicate a FTM request frame. The Trigger field set to "1" indicates that the initiating STA requests that the responding STA start or continue sending FTM measurement frames. The Trigger field set to "0" indicates that the initiating STA requests that the responding STA stop sending FTM measurement frames. The LCI Measurement Request field, if present, contains a Measurement Request element with Measurement Type equal to LCI request, which indicates a request for a Measurement Report element with Measurement Type equal to LCI. The Location Civic Measurement Request field, if present, contains a Measurement Request element with Measurement Type equal to Location Civic Request, which indicates a request for Measurement Report element with Measurement Type equal to Location Civic report. The FTM Parameter field is present in the initial FTM Request frame, and is not present in subsequent FTM Request trigger frames. If present, it contains a FTM parameter element.

FIG. 4B is an example of an FTM action frame 420. As depicted by FIG. 4B, FTM action frame 420 comprises a 1-octet Category field, a 1-octet Public Action field, a 1-octet Dialog Token field, a 1-octet Follow Up Dialog Token field, a 6-octet TOD field, a 6-octet TOA field, a 2-octet TOD Error field, a 2-octet TOA Error field, an optional LCI Report field, an optional Location Civic Report field, and an optional FTM Parameter field. The category field is set to the value for Public. The Public Action filed is set to indicate a FTM frame. The Dialog Token field is a nonzero value chosen by the responding STA to identify the FTM frame as the first of a pair, with the second or follow-up FTM frame to be sent later. The Dialog Token field is set to "0" to indicate that the FTM frame will not be followed by a subsequent follow-up FTM frame. The Follow Up Dialog Token field is the nonzero value of the Dialog Token field of the last transmitted FTM frame to indicate that it is the follow up FTM frame and that the TOD, TOA, Max TOD Error and Max TOA Error fields contain the values of the timestamps captured with the first FTM frame of the pair. The Follow Up Dialog Token field is set to "0" to indicate that the FTM frame is not a follow up to a last transmitted FTM. The TOD, TOA, Max TOD Error, and Max TOA Error fields are expressed in units of 0.1 ns. The TOD field contains a timestamp that represents the time, with respect to a time base, at which the start of the preamble of the last transmitted FTM frame appeared at the transmit antenna connector. The TOA field contains a timestamp that represents the time, with respect to a time base, at which the start of the preamble of the ACK frame to the last transmitted FTM frame arrived at the receive antenna connector. The Max TOD Error field contains an upper bound for the error in the value specified in the TOD field. The Max TOA Error field contains an upper bound for the error in the value specified in the TOA field. The LCI Report field is optionally present. If present, it contains a Measurement Report element with Measurement Type equal to LCI report. The Location Civic Report field is optionally present. If present, it contains a Measurement Report element with Measurement Type equal to Location Civic report. The Fine Timing Measurement Parameter field is present in the initial Fine Timing Measurement Frame, and is not present in subsequent Fine Timing Measurement frames. If present, it contains a Fine Timing Measurement Parameter element.

Figure 5A:
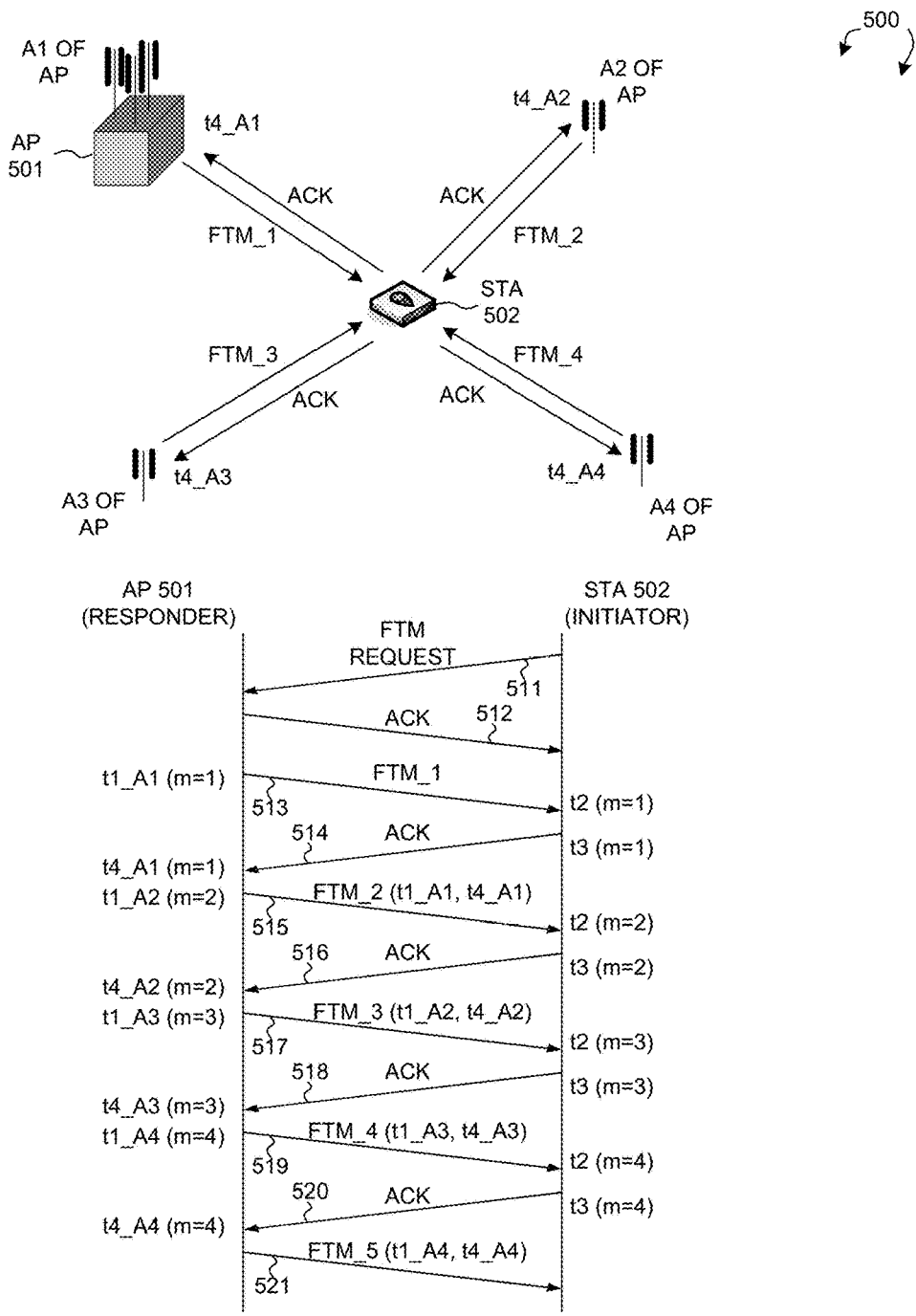
FIG. 5A illustrates an STA initiated baseline FTM protocol with multi-antenna AP.

FIG. 5A illustrates an STA initiated baseline FTM protocol with multi-antenna AP in a wireless location area network 500. Wireless local area network 500 is an indoor network and comprises a multi-antenna access point AP 501 and a wireless non-AP station STA 502. AP 501 is a multi-antenna AP comprising at least four antennas A1-A4. The multiple antennas are strategically located in separate physical locations, via long extending cables (not shown). In the example of FIG. 5A, STA 502 is an initiating device that initiates an FTM positioning procedure, while AP 501 is a responding device that responds to the FTM positioning procedure.

In step 511, STA 502 initiates an FTM procedure by sending an FTM request to AP 501 to set up the joint operation for antenna A1, A2, A3, A4. In step 512, AP 501 accepts the FTM request and sends an ACK frame back to STA 502. In step 513, AP 501 transmits a first FTM measurement frame FTM_1 via its first antenna A1 at time instance t1_A1 (m=1), which denotes the first measurement session. STA 502 receives FTM_1 at time instance t2 (m=1).

In step 514, STA 502 transmits an ACK frame to AP 501 at time instance t3 (m=1). AP 501 receives the ACK frame via antenna A1 at time instance t4_A1 (m=1). In step 515, AP 501 transmits a second FTM measurement frame FTM_2 via its second antenna A2 at time instance t1_A2 (m=2), denotes the second measurement session. FTM_2 payload also includes the timestamps t1_A1 and t4_A1 of the first measurement session. STA 502 receives FTM_2 at time instance t2 (m=2). In step 516, STA 502 transmits an ACK frame to AP 501 at time instance t3 (m=2). AP 501 receives the ACK frame via antenna A1 at time instance t4_A2 (m=2). The same FTM frame exchange repeats between STA 502 and antenna A3 for the third measurement session (m=3), and between STA 502 and antenna A4 for the fourth measurement session (m=4). After a previous measurement session is completed, STA 502 receives the timestamps of the previous measurement session in a subsequent FTM payload.

Based on the FTM measurement results, STA 502 computes the time-of-flight (TOF) or Round Trip Delay (RTD/2) and its corresponding range/distance to each antenna of AP 501. For example:

$$TOF\_A1=[(t4\_A1-t1\_A1)-(t3-t2)]/2 \ (m=1)$$

$$TOF\_A2=[(t4\_A2-t1\_A2)-(t3-t2)]/2 \ (m=2)$$

$$TOF\_A3=[(t4\_A3-t1\_A3)-(t3-t2)]/2 \ (m=3)$$

$$TOF\_A4=[(t4\_A4-t1\_A4)-(t3-t2)]/2 \ (m=4)$$

and $$Distance \ to \ A1=C*TOF\_A1$$

$$Distance \ to \ A2=C*TOF\_A2$$

$$Distance \ to \ A3=C*TOF\_A3$$

$$Distance \ to \ A4=C*TOF\_A4$$

where

C is the speed of radio signal.

In three-dimensional (3D) positioning, if STA 502 knows the absolute locations of the AP/antennas, and its relative range to each of the four antennas, then STA 502 is able to determine its own location.

Figure 5B:
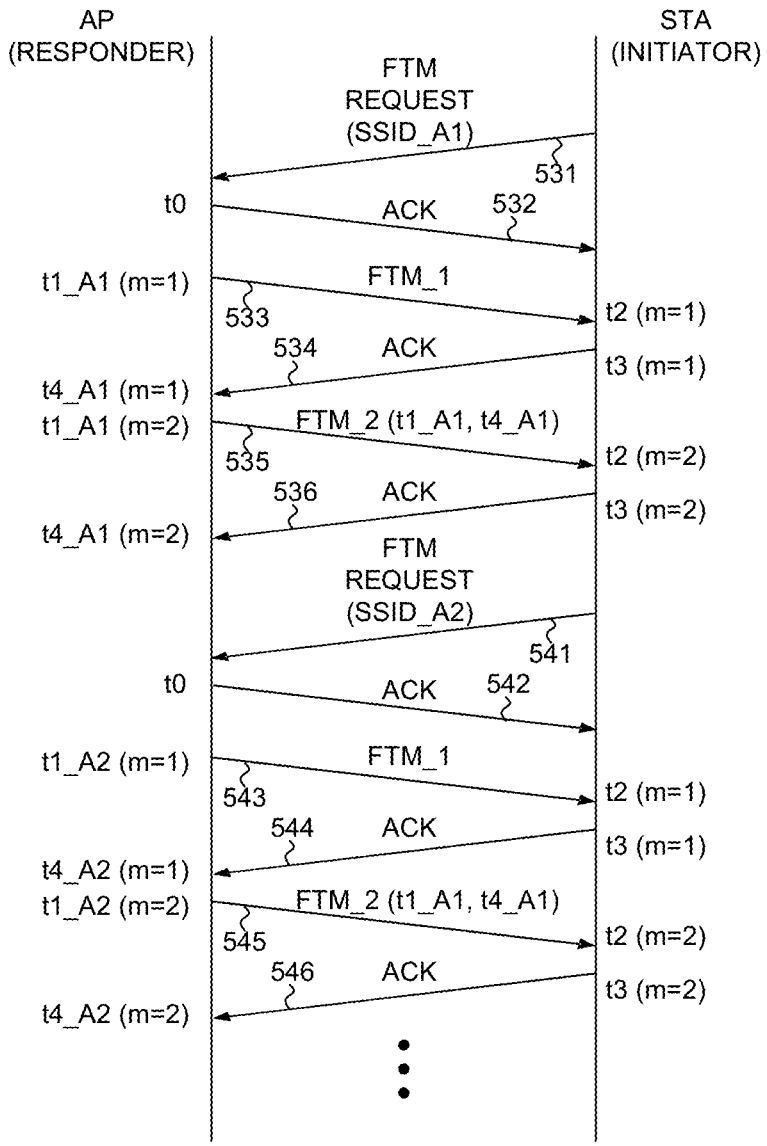
FIG. 5B illustrates an STA initiated baseline FTM protocol with multi-antenna AP, where the AP designates different SSIDs for operations via different antennas.

FIG. 5B illustrates another embodiment of an STA initiated baseline FTM protocol with a multi-antenna AP. In the example of FIG. 5B, the AP designates different SSIDs for operations via different antennas. An independent FTM request and FTM measurement procedure is initiated by the station using an SSID is used for each antenna. Note that this operation complies with the current IEEE 802.11REVmc protocol. In step 531, the STA sends an FTM request using SSID_A1 for antenna A1 of the AP. In step 532, the STA receives an ACK from the AP. In step 533, the AP sends a first FTM frame FTM_1 via antenna A1 at time instance t1_A1 (m=1), which is received by the STA at time instance t2 (m=1). In step 534, the STA sends an ACK in response to FTM_1 at time instance t3 (m=1), which is received by the AP via antenna A1 at time instance t4_A1 (m=1). In step 535, the AP sends a second FTM frame FTM_2 via antenna A1 at time instance t1_A1 (m=2), which is received by the STA at time instance t2 (m=2). The payload of FTM_2 includes timestamps t1_A1 and t4_A1. In step 536, the STA sends an ACK back to the AP at time instance t3 (m=2), which is received by the AP via antenna A1 at time instance t4_A1.

Similarly, in step 541, the STA sends an FTM request using SSID_A2 for antenna A2 of the AP. In step 542, the STA receives an ACK from the AP. In step 543, the AP sends a first FTM frame FTM_1 via antenna A2 at time instance t1_A2 (m=1), which is received by the STA at time instance t2 (m=1). In step 544, the STA sends an ACK in response to FTM_1 at time instance t3 (m=1), which is received by the AP via antenna A2 at time instance t4_A2 (m=1). In step 545, the AP sends a second FTM frame FTM_2 via antenna A2 at time instance t1_A2 (m=2), which is received by the STA at time instance t2 (m=2). The payload of FTM_2 includes timestamps t1_A2 and t4_A2. In step 546, the STA sends an ACK back to the AP at time instance t3 (m=2), which is received by the AP via antenna A2 at time instance t4_A2. The same FTM frame exchange may happen between the STA and the AP via its third and fourth antennas. Similar to FIG. 5A, the station is then able to determine its location based on the FTM ranging results with the four antennas of the AP.

Figure 5C:
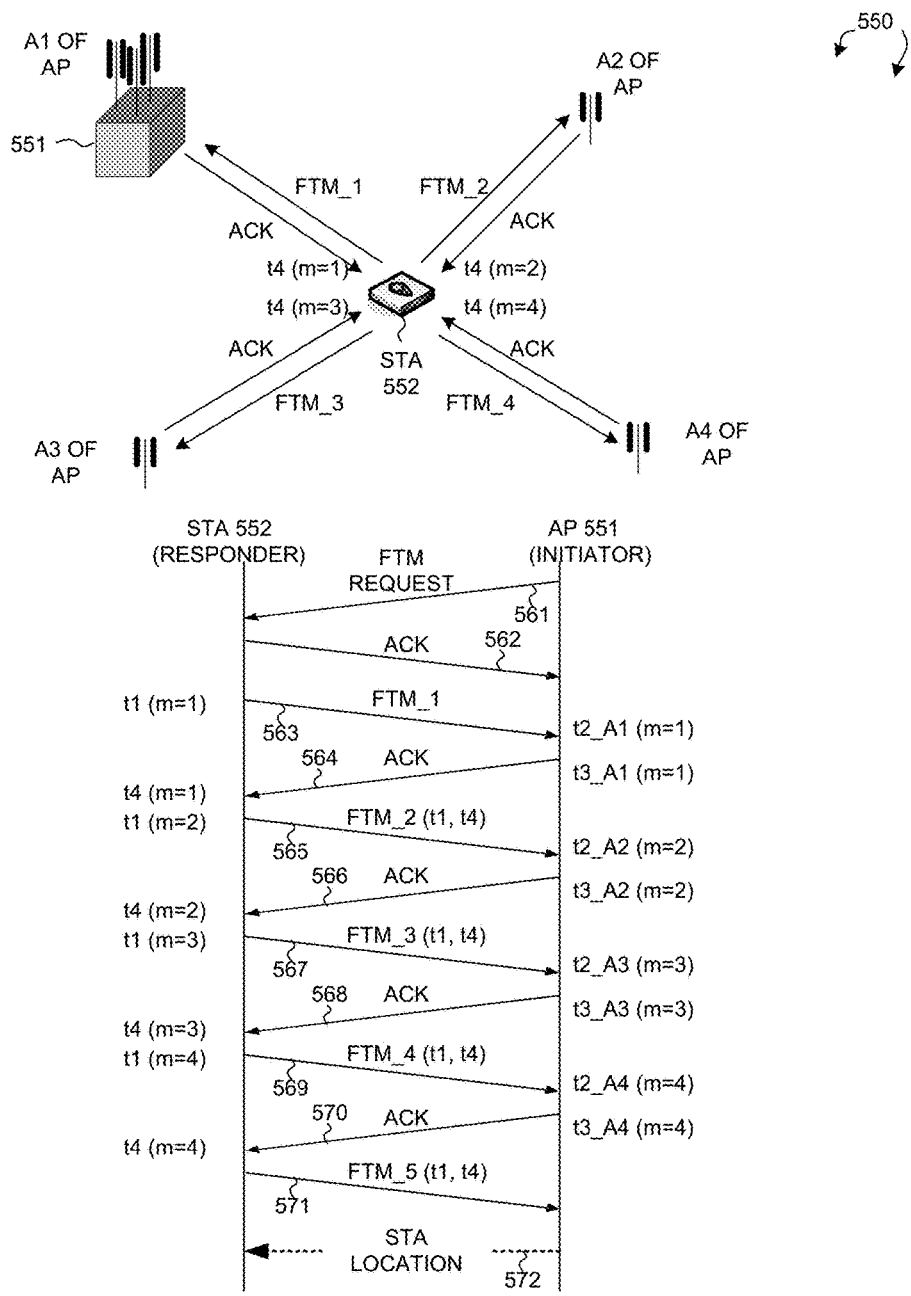
FIG. 5C illustrates an AP initiated baseline FTM protocol with multi-antenna AP.

FIG. 5C illustrates an AP initiated baseline FTM protocol with multi-antenna AP in a wireless location area network 550. Wireless local area network 550 is an indoor network and comprises a multi-antenna access point AP 551 and a wireless non-AP station STA 552. AP 551 is a multi-antenna AP comprising at least four antennas A1-A4. The multiple antennas are strategically located in separate physical locations, via long extending cables (not shown). In the example of FIG. 5C, AP 551 is an initiating device that initiates an FTM positioning procedure, while STA 552 is a responding device that responds to the FTM positioning procedure. Typically, a wireless station is normally the initiator due to privacy reason. However, for some application, it is desirable that an AP can track the location of certain stations. For example, in a warehouse environment, the AP may want to track the exact location of each station for efficient management of processing shipping and handling.

In step 561, AP 551 initiates an FTM procedure by sending an FTM request to STA 552 to set up the joint FTM operation for all four antennas. In step 562, STA 552 accepts the FTM request and sends an ACK frame back to AP 551. In step 563, STA 552 transmits a first FTM measurement frame FTM_1 at time instance t1 (m=1), which denotes the first measurement session. AP 551 receives FTM_1 via its first antenna A1 at time instance t2_A1 (m=1). In step 564, AP 551 transmits an ACK frame to STA 552 via antenna A1 at time instance t3_A1 (m=1). STA 552 receives the ACK frame at time instance t4 (m=1). STA 552 and AP 551 repeats the same measurement session for m=2, m=3, and m=4 via antenna A2, A3, and A4 respectively. After a previous measurement session is completed, AP 551 receives the timestamps of the previous measurement session in a subsequent FTM payload. For example, FTM_2 payload includes timestamps t1 (m=1) and t4 (m=1) from the first measurement session.

Based on the FTM measurement results, AP 551 computes the time-of-flight (TOF) or Round Trip Delay (RTD/2) and its corresponding range/distance from each antenna to STA 552. For example:

$$TOF\_A1=[(t4-t1)-(t3\_A1-t2\_A1)]/2 \ (m=1)$$

$$TOF\_A2=[(t4-t1)-(t3\_A2-t2\_A2)]/2 \ (m=2)$$

$$TOF\_A3=[(t4-t1)-(t3\_A3-t2\_A3)]/2 \ (m=3)$$

$$TOF\_A4=[(t4-t1)-(t3\_A4-t2\_A4)]/2 \ (m=4)$$

and $$Distance \ to \ A1=C*TOF\_A1$$

Distance to $A2 = C*\text{TOF}\_A2$

Distance to $A3 = C*\text{TOF}\_A3$

Distance to $A4 = C*\text{TOF}\_A4$ where

C is the speed of radio signal.

Note that alternatively, the AP can designate different SSIDs for operations via different antennas. AP can initiate an independent FTM request and FTM measurement procedure using a SSID for each antenna.

In three-dimensional (3D) positioning, based on the relative range/distance from each of the four antennas to STA 552, AP 551 is able to determine the absolute location of STA 552. Finally, in step 572, AP 551 may optionally sends the STA location to STA 551.

Figure 6:
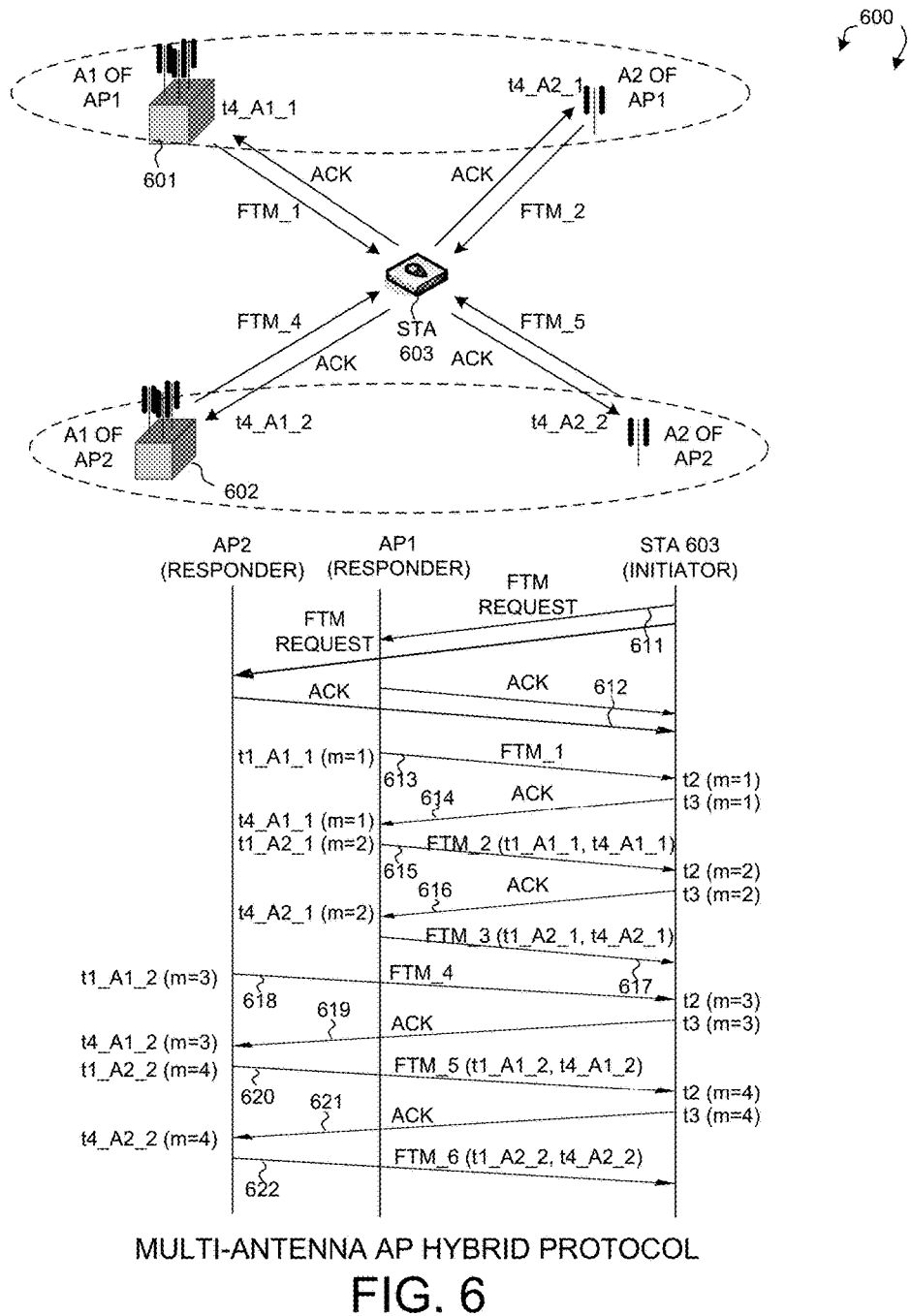
FIG. 6 illustrates a hybrid FTM protocol with multi-antenna AP.

FIG. 6 illustrates a hybrid FTM protocol with multi-antenna AP in a wireless location area network 600. Wireless local area network 600 is an indoor network and comprises two multi-antenna access points AP1 601 and AP2 602 and a wireless non-AP station STA 603. AP1 AP2 are multi-antenna APs comprising at least two antennas A1-A2. The multiple antennas are strategically located in separate physical locations, via long extending cables (not shown). In the example of FIG. 6, STA 603 is an initiating device that initiates an FTM positioning procedure, while AP1 and AP2 are responding devices that respond to the FTM positioning procedure.

In step 611, STA 603 sends FTM requests to both AP1 and AP2. In step 612, STA 603 receives ACKs from AP1 and AP2. Note that channel switching may be required if AP1 and AP2 operate in different channels. In step 613, AP1 transmits a first FTM measurement frame FTM_1 via its first antenna A1 at time instance t1_A1_1 (m=1), which denotes the first measurement session. STA 603 receives FTM_1 at time instance t2 (m=1). In step 614, STA 603 transmits an ACK frame to AP1 at time instance t3 (m=1). AP1 receives the ACK frame via antenna A1 at time instance t4_A1_1 (m=1). In step 615, AP1 transmits a second FTM measurement frame FTM_2 via its second antenna A2 at time instance t1_A2_1 (m=2), denotes the second measurement session. FTM_2 payload also includes the timestamps t1_A1_1 and t4_A1_1 of the first measurement session. STA 603 receives FTM_2 at time instance t2 (m=2). In step 616, STA 603 transmits an ACK frame to AP1 at time instance t3 (m=2). AP1 receives the ACK frame via antenna A2 at time instance t4_A2_1 (m=2). In step 617, AP1 transmits a third FTM frame FTM_3 to STA 603. FTM_3 payload includes the timestamps t1_A1_1 and t4_A2_1 of the second measurement session. After channel switching, if necessary, the same FTM frame exchange repeats between STA 603 and antenna A1 of AP2 for the third measurement session (m=3), and between STA 603 and antenna A2 of AP2 for the fourth measurement session (m=4). In this hybrid embodiment, the FTM operation with two APs are still simpler than the traditional FTM operation with four APs.

Based on the FTM measurement results, STA 603 computes the time-of-flight (TOF) or Round Trip Delay (RTD/2) and its corresponding range/distance to each antenna of both AP1 and AP2. For example:

$\text{TOF}\_A1\_1 = [(t4\_A1\_1 - t1\_A1\_1) - (t3 - t2)]/2 \ (m=1)$ $\text{TOF}\_A2\_1 = [(t4\_A2\_1 - t1\_A2\_1) - (t3 - t2)]/2 \ (m=2)$ $\text{TOF}\_A1\_2 = [(t4\_A1\_2 - t1\_A1\_2) - (t3 - t2)]/2 \ (m=3)$ $\text{TOF}\_A2\_2 = [(t4\_A2\_2 - t1\_A2\_2) - (t3 - t2)]/2 \ (m=4)$ and Distance to $A1$ of $AP1 = C*\text{TOF}\_A1\_1$ Distance to $A2$ of $AP1 = C*\text{TOF}\_A2\_1$ Distance to $A1$ of $AP2 = C*\text{TOF}\_A1\_2$ Distance to $A2$ of $AP2 = C*\text{TOF}\_A2\_2$ where C is the speed of radio signal.

In three-dimensional (3D) positioning, if STA 603 knows the absolute location of the APs/antennas, and its relative range/distance to each antenna, then STA 603 is able to determine its own location.

Figure 7:
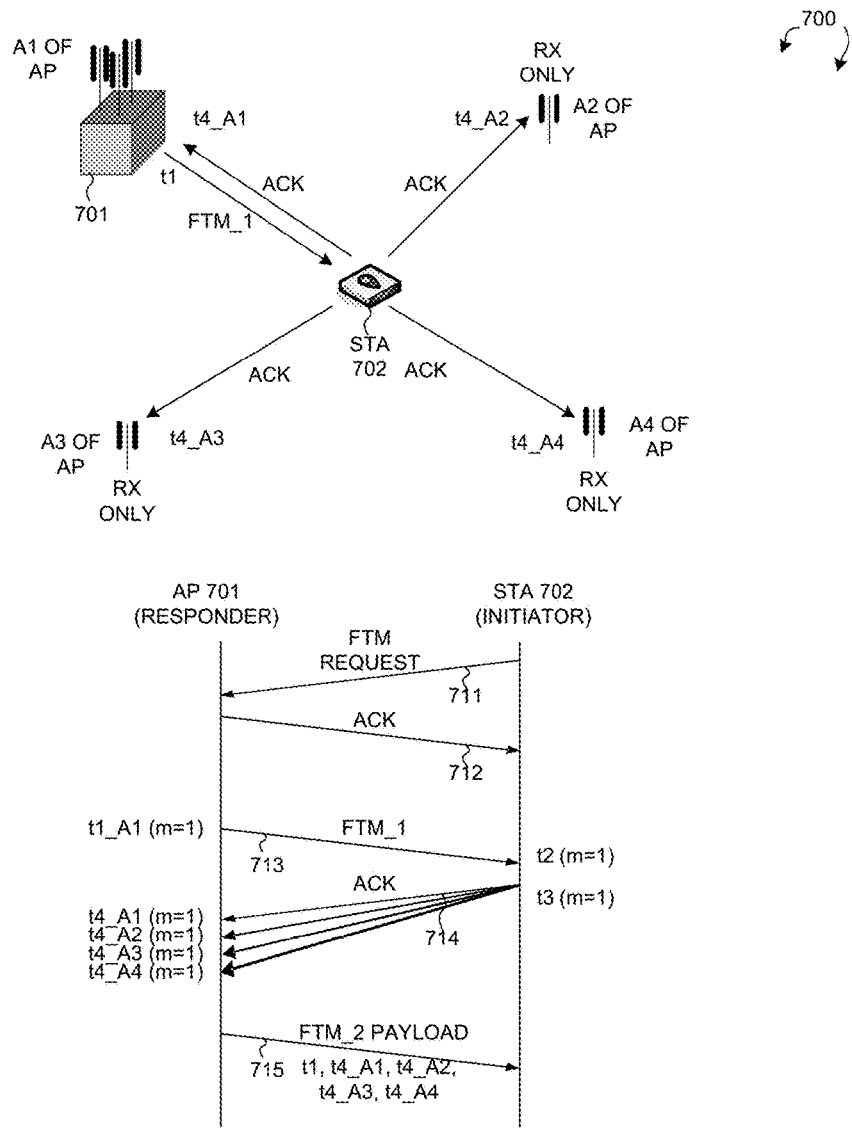
FIG. 7 illustrates a simplified implementation of an STA initiated FTM protocol with multi-antenna AP.

FIG. 7 illustrates a simplified implementation of an STA initiated FTM protocol with multi-antenna AP in a wireless local area network 700. Wireless local area network 700 is an indoor network and comprises a multi-antenna access point AP 701 and a wireless non-AP station STA 702. AP 701 is a multi-antenna AP comprising at least four antennas A1-A4. The multiple antennas are strategically located in separate physical locations, via long extending cables (not shown). In addition, three antennas A2-A4 only receives radio frames passively. In the example of FIG. 7, STA 702 is an initiating device that initiates an FTM positioning procedure, while AP 701 is a responding device that responds to the FTM positioning procedure.

In step 711, STA 702 initiates an FTM procedure by sending an FTM request to AP 701. In step 712, AP 701 accepts the FTM request and sends an ACK frame back to STA 702. In step 713, AP 701 transmits a first FTM measurement frame FTM_1 via its first antenna A1 at time instance t1_A1 (m=1), which denotes the first measurement session. STA 702 receives FTM_1 at time instance t2 (m=1). In step 714, STA 702 transmits an ACK frame to AP 701 at time instance t3 (m=1). AP 701 receives the ACK frame via antenna A1 at time instance t4_A1 (m=1), via antenna A2 at time instance t4_A2 (m=1), via antenna A3 at time instance t4_A3 (m=1), and via antenna A4 at time instance t4_A4 (m=1), all during the first measurement session. In step 715, AP 701 transmits a second FTM frame FTM_2 to STA 702. The FTM_2 payload includes the previous timestamps of t1_A1, t4_A1, t4_A2, t4_A3, and t4_A4. Because AP 701 can simultaneously measure time t4 from all of its four antennas, four-time reduction of FTM measurement frame exchange can be achieved in this simplified implementation.

Based on the received timestamps, STA 702 computes the time-of-flight (TOF) or Round Trip Delay (RTD/2) and its corresponding range/distance to each antenna of AP 701. For example:

$\text{TOF}\_A1 = [(t4\_A1 - t1\_A1) - (t3 - t2)]/2 \ (m=1)$ $\text{TOF}\_A2 = [(t4\_A2 - t1\_A1) - (t3 - t2)] - \text{TOF}\_A1 \ (m=1)$ $\text{TOF}\_A3 = [(t4\_A3 - t1\_A1) - (t3 - t2)] - \text{TOF}\_A1 \ (m=1)$ $\text{TOF}\_A4 = [(t4\_A4 - t1\_A1) - (t3 - t2)] - \text{TOF}\_A1 \ (m=1)$ and Distance to $A1 = C*\text{TOF}\_A1$ Distance to $A2 = C*\text{TOF}\_A2$ Distance to $A3 = C*\text{TOF}\_A3$ Distance to $A4 = C*\text{TOF}\_A4$ where C is the speed of radio signal.

In three-dimensional (3D) positioning, if STA 702 knows the absolute locations of the AP/antennas, and its relative range to each of the four antennas, then STA 702 is able to determine its own location.

Figure 8:
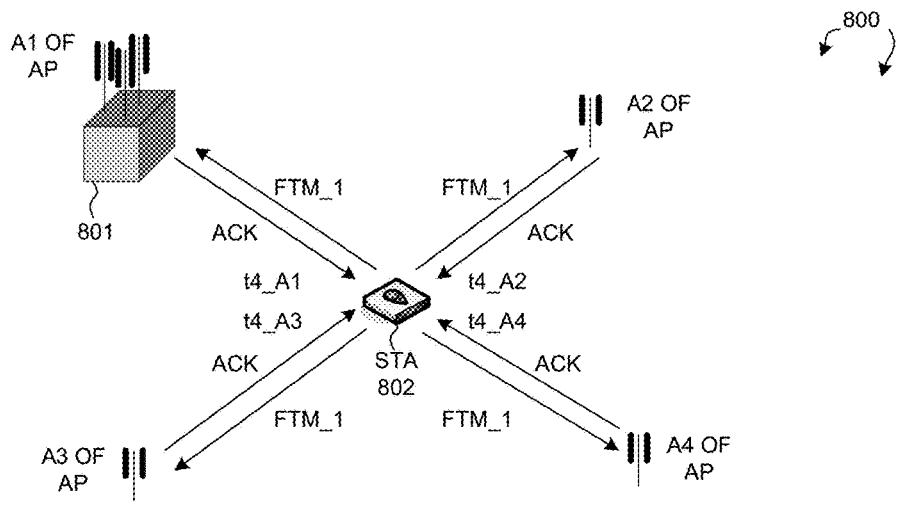
FIG. 8 illustrates a simplified implementation of an AP initiated FTM protocol with multi-antenna AP.
Figure 8:
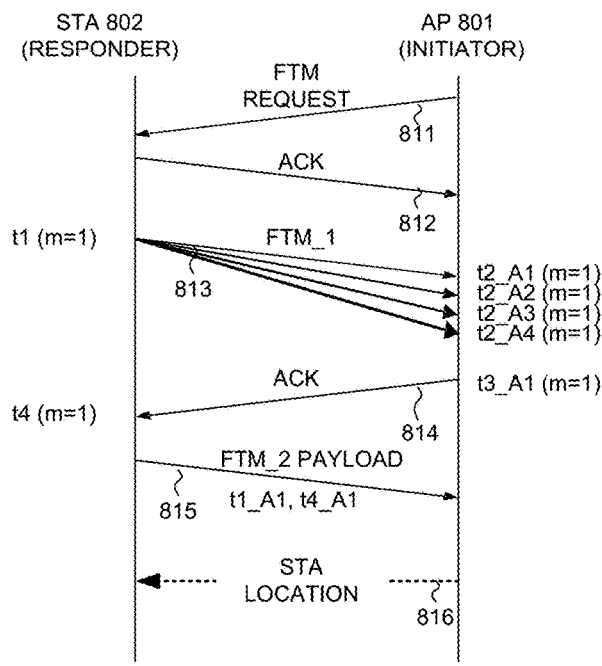

FIG. 8 illustrates a simplified implementation of an AP initiated FTM protocol with multi-antenna AP in a wireless local area network 800. Wireless local area network 800 is an indoor network and comprises a multi-antenna access point AP 801 and a wireless non-AP station STA 802. AP 801 is a multi-antenna AP comprising at least four antennas A1-A4. The multiple antennas are strategically located in separate physical locations, via long extending cables (not shown). In the example of FIG. 8, AP 801 is an initiating device that initiates an FTM positioning procedure to track STA location, while STA 802 is a responding device that responds to the FTM positioning procedure.

In step 811, AP 801 initiates an FTM procedure by sending an FTM request to STA 802. In step 812, STA 802 accepts the FTM request and sends an ACK frame back to AP 801. In step 813, STA 802 transmits a first FTM measurement frame FTM_1 at time instance t1 (m=1), which denotes the first measurement session. AP 801 receives FTM_1 via antenna A1 at time instance t2_A1, via antenna A2 at time instance t2_A2, via antenna A3 at time instance t2_A3, and via antenna A4 at time instance t2_A4. In step 814, AP 801 transmits a corresponding ACK frame to STA 802 at time instance t3_A1 via antennas A1. STA 802 receives the ACK frame at time instance t4 from antenna A1. In step 815, STA 802 transmits a second FTM frame FTM_2 to AP 801. The FTM_2 payload includes the previous timestamps of t1_A1 and t4_A1.

Based on the received timestamps, AP 801 computes the time-of-flight (TOF) or Round Trip Delay (RTD/2) and its corresponding range/distance from each antenna to STA 802. For example:

$$TOF\_A1=[(t4-t1)-(t3\_A1-t2\_A1)]/2 \ (m=1)$$

$$TOF\_A2=[(t4-t1)-(t3\_A1-t2\_A2)]-TOF\_A1 \ (m=1)$$

$$TOF\_A3=[(t4-t1)-(t3\_A1-t2\_A3)]-TOF\_A1 \ (m=1)$$

$$TOF\_A4=[(t4-t1)-(t3\_A1-t2\_A4)]-TOF\_A1 \ (m=1)$$

and

Distance to $A1=C*TOF\_A1$

Distance to $A2=C*TOF\_A2$

Distance to $A3=C*TOF\_A3$

Distance to $A4=C*TOF\_A4$ where

C is the speed of radio signal.

In three-dimensional (3D) positioning, based on the relative range/distance from each of the four antennas to STA 802, AP 801 is able to determine the absolute location of STA 802. Finally, in step 816, AP 801 may optionally sends the STA location to STA 802.

Figure 9:
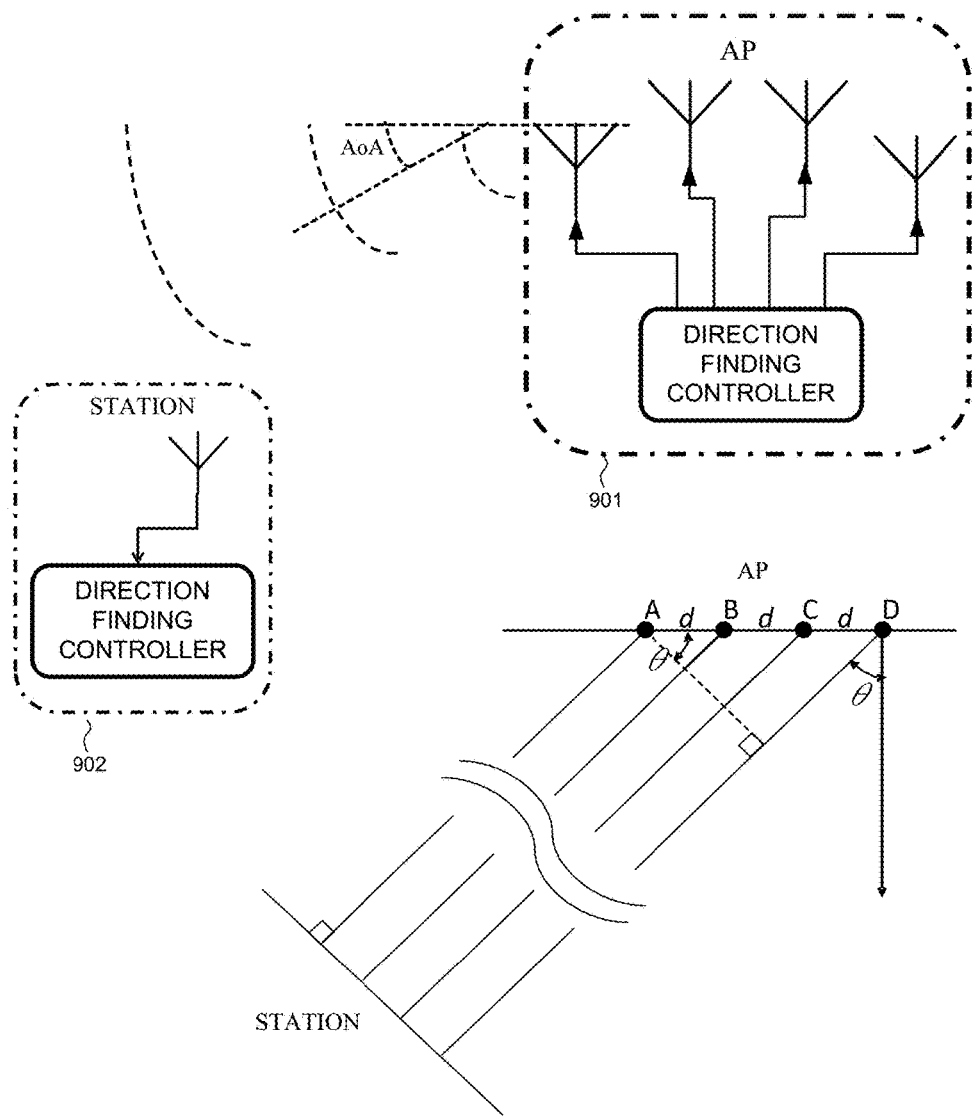
FIG. 9 illustrates multi-antenna AP FTM protocol using Angle of Arrival.

FIG. 9 illustrates multi-antenna AP FTM protocol using Angle of Arrival (AoA). In addition to determining location based on range or distance, AoA measurement is a method for determining the direction of propagation of a radio signal on an antenna array. AoA determines the direction by measuring the Time Difference of Arrival (TDOA) at individual antenna elements of the array, and from these delays, the AoA can be calculated. In the example of FIG. 9, AP 901 has an antenna array and a direction-finding controller, while STA 902 has a single antenna and a direction-fining controller. The timing delay from the station to the AP can be measured based on distance (d), and the AoA (θ) can be calculated. The knowledge of AoA can be combined with the knowledge of the distance between the AP and the station so that the AP can determine the location of the STA.

Figure 10:
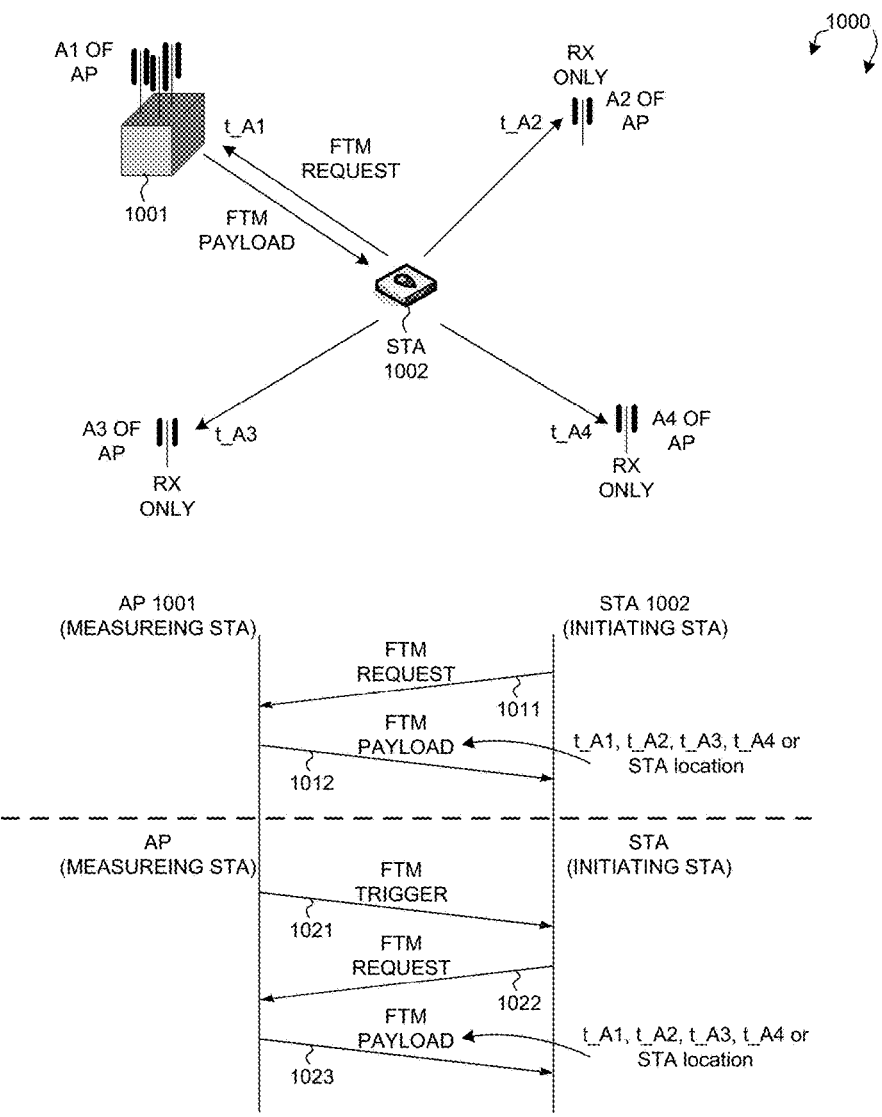
FIG. 10 illustrates one embodiment of reducing airtime for a simplified implementation of FTM protocol with multi-antenna AP.

FIG. 10 illustrates one embodiment of reducing airtime for a simplified implementation of FTM protocol with multi-antenna AP in a wireless local area network 1000. Wireless local area network 1000 is an indoor network and comprises a multi-antenna access point AP 1001 and a wireless non-AP station STA 1002. AP 1001 is a multi-antenna AP comprising at least four antennas A1-A4. The multiple antennas are strategically located in separate physical locations, via long extending cables (not shown). In addition, three antennas A2-A4 only receives radio frames passively. In the example of FIG. 10, STA 1002 is an initiating device that initiates an FTM positioning procedure, while AP 1001 is a responding device that responds to the FTM positioning procedure.

In one embodiment, in step 1011, STA 1002 initiates an FTM procedure by sending an FTM request to AP 1001. AP 1001 constantly measures the timestamps (t_A1, t_A2, t_A3, and tA4) of receiving the FTM request via each of the antennas A1-A4, respectively. In step 1012, AP 1001 sends the timestamps to STA 1002 so that it can calculate its location. Alternatively, AP 1001 calculates the STA position using triangulation and send the STA position to STA 1002 in step 1012. In another embodiment, in step 1021, AP 1001 initiates the FTM procedure by sending an FTM trigger to STA 1002. In response, STA 1002 sends an FTM request to AP 1001 in step 1022. AP 1001 constantly measures the timestamps (t_A1, t_A2, t_A3, and tA4) of receiving the FTM request via each of the antennas A1-A4, respectively. In step 1023, AP 1001 sends the timestamps to STA 1002 so that it can calculate its location. Alternatively, AP 1001 calculates the STA position using triangulation and send the STA position to STA 1002 in step 1023. In the embodiments of FIG. 10, airtime is further reduced by constantly measuring via different antennas and eliminating FTM measurement frame exchanges.

Figure 11:
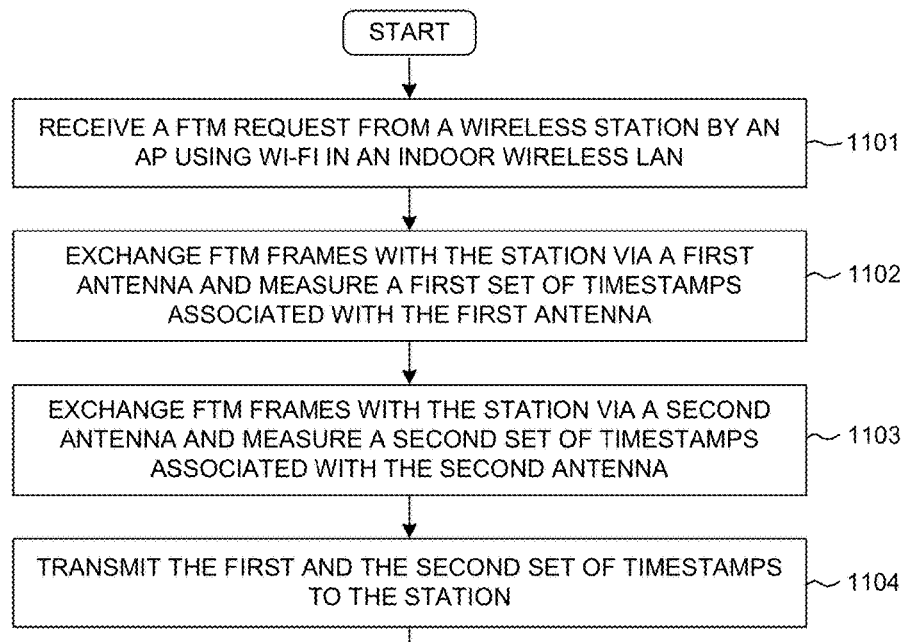
FIG. 11 is a flow chart of a method of a baseline FTM protocol with multi-antenna AP in accordance with one novel aspect.

FIG. 11 is a flow chart of a method of a baseline FTM protocol with multi-antenna AP in accordance with one novel aspect. In step 1101, an access point (AP) receives an FTM request from a wireless station (STA) using Wi-Fi technology in an indoor wireless local area network. In step 1102, the AP exchanges FTM frames with the station via a first antenna and measures a first set of timestamps associated with the first antenna. In step 1103, the AP exchanges FTM frames with the station via a second antenna and measures a second set of timestamps associated with the second antenna. In step 1104, the AP transmits the first and the second set of timestamps to the station. In one embodiment, each antenna is physical separated by cables, and each antenna is associated with an independent Basic Service Set ID (BBSID). In another embodiment, the AP has at least four antennas for determining an absolute location of the station.

Figure 12:
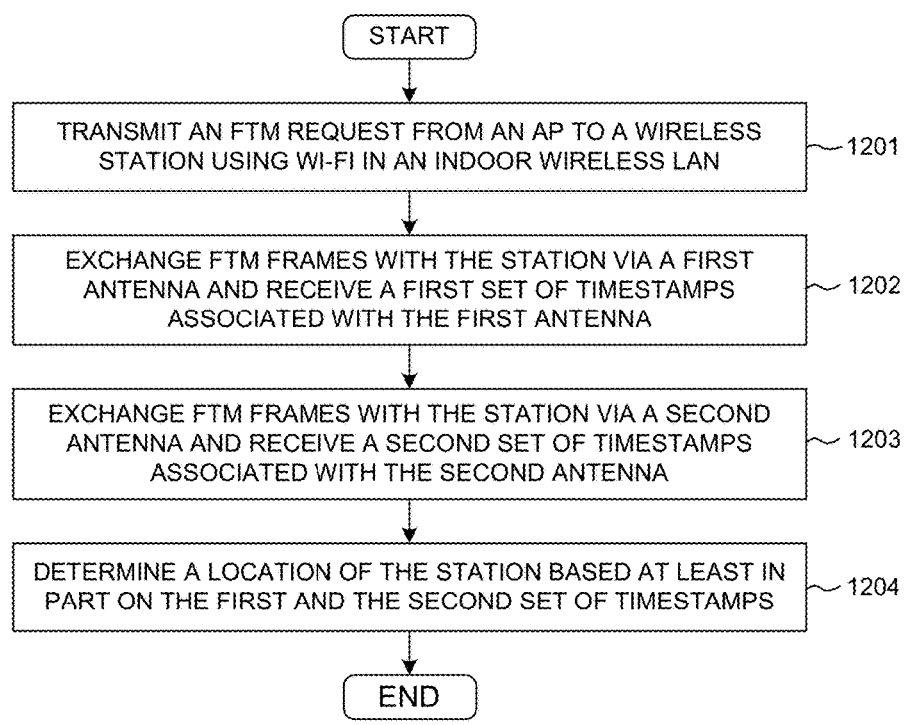
FIG. 12 is a flow chart of a method of a simplified FTM protocol with multi-antenna AP in accordance with one novel aspect.

FIG. 12 is a flow chart of a method of a simplified FTM protocol with multi-antenna AP in accordance with one novel aspect. In step 1201, an access point (AP) transmits an FTM request to a wireless station (STA) using Wi-Fi technology in an indoor wireless local area network. In step 1202, the AP exchanges FTM frames with the station via a first antenna and receives a first set of timestamps associated with the first antenna. In step 1203, the AP exchanges FTM frames with the station via a second antenna and receives a second set of timestamps associated with the second antenna. In step 1204, the AP determines a location of the station based at least in part on the first and the second set of timestamps. In one embodiment, each antenna is physical separated by cables, and each antenna is associated with an independent Basic Service Set ID (BBSID). In another embodiment, the AP has at least four antennas for determining an absolute location of the station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a first fine timing measurement (FTM) frame from a wireless station by a first and second antenna of an access point (AP) in an indoor wireless local area network, wherein the FTM frame is received by the first antenna at a first time, wherein the FTM frame is received by the second antenna at a second time, wherein the first time and second time are stored in the access point;
   (b) sending an acknowledgment (ACK) frame to the wireless device via the first antenna of the access point only after the FTM frame is received by both the first and the second antennas of the access point; and
   (c) receiving by the first antenna of the access point a second FTM frame from the wireless station, wherein the second FTM frame includes a time stamp of a third time when the wireless station transmitted the first FTM frame and a time stamp of a fourth time when the wireless station received the ACK frame, and wherein the time-of-flight for the first and second antenna are calculated by the access point using the first time, second time, third time and fourth time, wherein the three-dimensional location of the wireless station is determined based on the time-of-flight of the first and second antenna, and a FTM request is sent by the access point before the first FTM frame is received by the access point.

2. The method of claim 1, wherein each antenna is connected by a Radio Frequency (RF) cable, and wherein each antenna is associated with an independent Basic Service Set ID (BBSID).

3. The method of claim 1, wherein a second ACK frame is received by the access point before the first FTM frame is received by the access point.

4. The method of claim 1, wherein the second FTM frame is transmitted by the wireless station.

5. The method of claim 1, wherein the access point includes a third and fourth antenna, and wherein the access point only transmits the ACK frame after the first FTM frame is received by all of the first, second, third and fourth antennas.

6. The method of claim 1, wherein the access point determines a distance between the wireless station and each of the first, second, third and fourth antennas.

7. A method comprising:
   (a) transmitting a one or more fine timing measurement (FTM) request from an access point (AP) to a wireless station in an indoor wireless local area network, wherein the AP comprises a first antenna and a second antenna placed in different locations;
   (b) receiving a FTM frame in response to (a), wherein the FTM frame is received by the first antenna at a first time and by the second antenna at a second time;
   (c) sending an acknowledgment (ACK) frame only after the FTM frame is received by both the first and second antennas; and
   (d) receiving a second FTM frame in response to (c), wherein the second FTM frame includes a first time stamp of when the wireless station transmitted the first FTM frame and a second time stamp of when the wireless station received the ACK frame; and
   (e) determining a time-of-flight for the first and second antenna based at least in part on the first and the second timestamps, wherein the time-of-flight of the first and second antenna are used to determine a three-dimensional location of the wireless station, and wherein a FTM request is transmitted by the access point before the first FTM request is received by the access point.

8. The method of claim 7, wherein each antenna is connected by a Radio Frequency (RF) cable, and wherein each antenna is associated with an independent Basic Service Set ID (BBSID).

9. The method of claim 7, wherein the access point initiates the FTM process by sending the FTM request.

10. The method of claim 7, wherein a second ACK frame is received by the access point before the first FTM frame is received by the access point.

11. The method of claim 7, wherein the second FTM frame is transmitted by the wireless station.

12. The method of claim 7, wherein the access point includes a third and fourth antenna, and wherein the access point only transmits the ACK frame after the first FTM frame is received by all of the first, second, third and fourth antennas.

* * * * *